(12) United States Patent
McIlwraith et al.

(10) Patent No.: US 10,115,486 B2
(45) Date of Patent: Oct. 30, 2018

(54) MODULAR COMPRESSION CHAMBER

(71) Applicant: General Fusion Inc., Burnaby (CA)

(72) Inventors: Lon William McIlwraith, Delta (CA); Michel Georges Laberge, West Vancouver (CA); Douglas H. Richardson, Anmore (CA)

(73) Assignee: General Fusion Inc., British Columbia (CA)

( * ) Notice: Subject to any disclaimer, the term of this patent is extended or adjusted under 35 U.S.C. 154(b) by 0 days.

(21) Appl. No.: 15/556,181

(22) PCT Filed: Mar. 3, 2016

(86) PCT No.: PCT/CA2016/050230
§ 371 (c)(1),
(2) Date: Sep. 6, 2017

(87) PCT Pub. No.: WO2016/141464
PCT Pub. Date: Sep. 15, 2016

(65) Prior Publication Data
US 2018/0053570 A1     Feb. 22, 2018

Related U.S. Application Data

(60) Provisional application No. 62/131,630, filed on Mar. 11, 2015.

(51) Int. Cl.
*G21B 3/00*     (2006.01)
*F15B 21/12*   (2006.01)

(52) U.S. Cl.
CPC .............. *G21B 3/008* (2013.01); *F15B 21/12* (2013.01)

(58) Field of Classification Search
CPC ................................... G21B 1/00; G21B 3/00
(Continued)

(56) References Cited

U.S. PATENT DOCUMENTS 3,346,458 A    10/1967  Schmidt
4,023,065 A     5/1977  Koloc
(Continued)

FOREIGN PATENT DOCUMENTS

JP      S55-501066      12/1980
WO      WO 80/00045      1/1980
(Continued)

OTHER PUBLICATIONS

International Search Report and Written Opinion in corresponding International Patent Application No. PCT/CA2016/050230, dated May 27, 2016, in 9 pages.
(Continued)

*Primary Examiner* — Scott R Kastler
(74) *Attorney, Agent, or Firm* — Knobbe, Martens, Olson & Bear, LLP (57) ABSTRACT

Examples of a modular compression chamber for use in a compression system are disclosed. The modular compression chamber comprises a plurality of individual modules and a plurality of fasteners to attach the plurality of modules in an interlocking fashion to form the chamber. The modules have a pre-determined geometry and size to form a compression chamber with a desired geometry and size. The plurality of fasteners keeps each of the individual modules in compression with neighboring modules so that the formed chamber maintains its integrity during operation. The modules can comprise a plurality of pressure wave generators to generate a pressure wave within the chamber. In one embodiment, the pressure wave generators have a pre-determined geometry and size and are configured to interlock with the neighboring generators forming the individual modules. The fasteners are configured to maintain intimate contact between side walls of the adjacent pressure wave generators.

17 Claims, 5 Drawing Sheets

(58) Field of Classification Search
USPC .......................................................... 376/150
See application file for complete search history.

(56) References Cited

U.S. PATENT DOCUMENTS

| | | | |
|---|---|---|---|
| 4,181,235 A * | 1/1980 | Baysinger | B65D 88/04 |
| | | | 114/74 A |
| 4,290,848 A | 9/1981 | Sudan | |
| 4,333,796 A | 6/1982 | Flynn | |
| 4,367,130 A | 1/1983 | Lemelson | |
| 4,790,735 A | 12/1988 | Mayer | |
| 4,917,785 A | 4/1990 | Juvan | |
| 5,015,432 A | 5/1991 | Koloc | |
| 5,041,760 A | 8/1991 | Koloc | |
| 5,659,173 A | 8/1997 | Putterman et al. | |
| 5,968,323 A | 10/1999 | Pless | |
| 6,396,213 B1 | 5/2002 | Koloc | |
| 6,477,216 B2 | 11/2002 | Koloc | |
| 7,679,025 B1 | 3/2010 | Krishnan et al. | |
| 8,746,598 B2 | 6/2014 | Bentaj et al. | |
| 8,887,618 B2 | 11/2014 | McIlwraith et al. | |
| 9,036,765 B2 * | 5/2015 | Birnbach | G21B 1/03 |
| | | | 376/105 |
| 9,267,515 B2 | 2/2016 | Suponitsky et al. | |
| 9,403,191 B2 | 8/2016 | McIlwraith et al. | |
| 9,463,478 B2 | 10/2016 | Suponitsky et al. | |
| 9,746,008 B2 | 8/2017 | McIlwraith et al. | |
| 2006/0198483 A1 | 9/2006 | Laberge | |
| 2006/0198486 A1 * | 9/2006 | Laberge | G21B 3/00 |
| | | | 376/150 |
| 2006/0198487 A1 | 9/2006 | Laberge | |
| 2009/0059718 A1 | 5/2009 | Tessien | |
| 2010/0163130 A1 * | 7/2010 | Laberge | G21B 3/00 |
| | | | 137/827 |
| 2010/0206847 A1 | 8/2010 | Chen et al. | |
| 2012/0014491 A1 | 1/2012 | Deeth | |
| 2013/0270747 A1 | 10/2013 | Tranter et al. | |
| 2014/0165552 A1 | 6/2014 | McIlwraith et al. | |
| 2015/0021339 A1 | 1/2015 | Felts et al. | |
| 2015/0152899 A1 | 6/2015 | McIlwraith et al. | |
| 2016/0318069 A1 | 11/2016 | McIlwraith et al. | |
| 2016/0361729 A1 | 12/2016 | Suponitsky et al. | |
| 2018/0053570 A1 * | 2/2018 | McIlwraith | G21B 3/008 |

FOREIGN PATENT DOCUMENTS

| | | |
|---|---|---|
| WO | WO 96/36969 | 11/1996 |
| WO | WO 97/49274 | 12/1997 |
| WO | WO 2010114360 | 10/2010 |
| WO | WO 2012/113057 A1 | 8/2012 |
| WO | WO 2016/141464 A1 | 9/2016 |

OTHER PUBLICATIONS

M. Delage et al., "Progress Towards Acoustic Magnetized Target Fusion: An Overview of the R&D Program at General Fusion", 33rd Ann. Conf. Can. Nuc. Soc., Jun. 2012, in 13 pages.

T.K. Fowler, "Pulsed Spheromak Fusion Reactors", Comments on Plasma Physics & Controlled Fusion, Comments on Modern Physics, vol. 1(3), Part C, Jun. 1999, pp. 83-98.

T.K. Fowler, "Pulsed Spheromak Reactor With Adiabatic Compression", Lawrence Livermore National Laboratory, Mar. 29, 1999, in 13 pages.

T.K. Fowler, "Stability of Spheromaks Compressed by Liquid Walls", Lawrence Livermore National Laboratory, Aug. 17, 1999, in 9 pages.

S. Howard et al., "Development of merged compact toroids for use as a magnetized target fusion plasma", Journal of Fusion Energy, Nov. 11, 2008, vol. 28, No. 2, pp. 156-161, available Jun. 2008.

R.C. Kirkpatrick, "Assessment of the Acoustically Driven MTF Experiments being conducted by Dr. Michel Laberge of General Fusion, Inc.," May 2007, in 3 pages.

Michel Laberge, "Acoustic Wave Driven MTF Fusion Reactor," Mar. 2007, in 20 pages.

Michel Laberge, "An Acoustically Driven Magnetized Target Fusion Reactor," Journal of Fusion Energy, vol. 27, Nos. 1-2, Jul. 11, 2007, pp. 65-68.

Michel Laberge, "Evidence of Fusion Products in Acoustically Driven MTF," Mar. 2007, in 41 pages.

Michel Laberge, "Experimental Results for an Acoustic Driver for MTF," Journal of Fusion Energy, Jun. 2009, vol. 28, Nos. 2, pp. 179-182, available Jun. 2008.

Logan, B.G., et al., "Compact Torus Accelerator Driven Inertial Confinement Fusion Power Plant HYLIFE-CT," Lawrence Livermore National Laboratory, UCRL-TR-211025, Apr. 1, 2005, in 85 pages.

R. L. Miller and R. A. Krakowski, "Assessment of the slowly-imploding liner (LINUS) fusion reactor concept", Los Alamos Scientific Laboratory, Oct. 1980, Issue Rept. No. LA-UR-80-3, Los Alamos, NM, USA, in 10 pages.

R. W. Moir et al., "HYLIFE-II: An approach to a long-lived, first-wall component for inertial fusion power plants", Lawrence Livermore National Lab, Aug. 1, 1994, vol. Report No. UCRL-J, Issue CONF-940933-46, in 15 pages.

Richardson et al., "Status of Progress Towards Acoustic Magnetized Target Fusion at General Fusion", 34th Annual Conference on the Canadian Nuclear Society, Jun. 12, 2013, in 15 pages.

V. Suponitsky et al., "An Overview of Computational Results at General Fusion Inc. with Focus on Hydrodynamics", Proceedings of CFD Society of Canada Conference, May 2012, in 9 pages.

V. Suponitsky et al., "On the Collapse of a Gas Cavity by an Imploding Molten Lead Shell and Richtmyer-Meshkov Instability", Proceedings of the 20th Annual Conference of the CFD Society of Canada, Canmore, Alberta, Canada, May 9-12, 2012, in 8 pages.

V. Suponitsky et al., "Richtmyer-Meshkov instability of a liquid-gas interface driven by a cylindrical imploding wave", Computers & Fluids, vol. 89, Jan. 20, 2014, in 19 pages.

Y.C.F. Thio et al., "Magnetized Target Fusion Driven by Plasma Liners", 2002, in 3 pages.

Y. C. F. Thio et al., "Magnetized Target Fusion in a Spheroidal Geometry With Standoff Drivers," Fusion Technology 20, 1991, in 22 pages.

F. D. Witherspoon et al., "A contoured gap coaxial plasma gun with injected plasma armature," American Institute of Physics, Review of Scientific Instruments 80, 083506, Aug. 2009, in 15 pages.

F. D. Witherspoon et al., "Pulsed Injector Development for Dense Plasma Jets," Research Funded by the DOE Office of Fusion Energy Science through Grants DE-FG02-04ER83978, DE-FG02-05ER54810, DE-FG02-05ER84189, Feb. 2007, in 32 pages.

G.A. Wurden et al., "Magnetized Target Fusion: A Burning FRC Plasma in an Imploded Metal Can", J. Plasma Fusion Res. Series, vol. 2, Aug. 1999, pp. 238-241.

G.A. Wurden, Letter to Dr. Laberge, May 2007, in 1 page.

* cited by examiner

MODULAR COMPRESSION CHAMBER

TECHNICAL FIELD

The present disclosure relates generally to a modular compression chamber in a compression system for generating pressure waves in a fluid in the compression chamber.

BACKGROUND

Unless otherwise indicated herein, the materials described in this section are not prior art to the claims in this application and are not admitted to be prior art by inclusion in this section.

A type of compression system known in the prior art comprises a plurality of pressure wave generators and a compression chamber that is typically a large cylindrical or spherical vessel made of steel or any other high strength material or combination thereof that is designed as a pressure vessel capable of withstanding continuous high pressure and/or high pressure pulses generated by the pressure wave generators. The compression chamber can be filled with a fluid medium, such as a liquid metal. The plurality of pressure wave generators can be arranged around and secured to the wall of the compression chamber. Each pressure wave generator can include a hammer piston that can be accelerated to impact an anvil that is secured within a corresponding opening formed in the wall of the compression chamber. The impact of the hammer upon the corresponding anvil causes a compression wave to travel through the anvil into the liquid medium thus generating a pressure wave in the liquid medium. The generated pressure wave from each individual pressure wave generator can propagate through the liquid medium forming a collective pressure wave that converges toward the center of the chamber. Examples of systems and methods for generating pressure waves in a compression chamber are described in the U.S. Patent Application Publication No. 2010/0163130, which is incorporated herein by reference in its entirety.

During the operation of the compression system, intermittent internal high pressure pulses can be generated, for example, by reflecting pressure waves inside the compression chamber. The compression chamber should be capable of withstanding such high pressures without fatiguing, and thus should be designed to be robust with relatively few weak points. There are few companies in the world which are capable of manufacturing pressure vessels suitable for use as a compression chamber in this type of compression system, and making such vessels are expensive with long lead times.

SUMMARY

In one aspect, a modular compression chamber for use in a compression system for generating pressure waves in a fluid in the compression chamber is provided. The modular compression chamber comprises a plurality of individual modules and a plurality of connecting means interlocking the individual modules together to form a wall of the chamber. Each of the individual modules has an outer face, an inner face and a side wall that extends between the outer and inner faces. At least one of the plurality of individual modules house at least one pressure wave generator that comprises a body with a first end, a second end, an elongated bore that extends from the second end into the body and an anvil mounted at the second end of the body. The anvil has a first end, a second end and a retainer that holds the anvil secured to the pressure wave generator. The anvil is positioned such that the first end of the anvil is placed into the bore and a face of the second end of the anvil forms at least a part of the inner face of one of the individual modules.

In another aspect, the at least one of the individual modules comprise a plurality of pressure wave generators in adjacent contact and interlocked together such that the bodies of the pressure wave generators define the side wall of the at least one of the individual modules. More particularly, the first ends of the pressure wave generators define the outer face of the at least one of the individual modules and the faces of the second ends of the anvils define at least a part of the inner face of the at least one of the individual modules.

In another aspect, the plurality of pressure wave generators are interlocked with a plurality of connecting means that comprise at least one dovetail shaped slot formed in a side wall of the body of each of the pressure wave generator. Each of the slots extends from a first end of the pressure wave generator toward a second end. The slot of one of the pressure wave generator faces the slot of an adjacent one of the pressure wave generator thus forming a double dovetail shaped passage. The plurality of connecting means further comprises a double dovetail wedge mating with the double dovetail passage such that when inserted into the double dovetail passage the adjacent pressure wave generators are interlocked into an individual module.

The plurality of connecting means further comprise a locker to provide a continuous pushing force to a back side of the double dovetail wedge to keep the wedge within the passage.

In one aspect, the plurality of individual modules has a cross-section geometry that is selected from a group of a hexagonal geometry and a pentagonal geometry. In addition, the second end of the anvil has a cross-section geometry selected from a group of a hexagonal geometry and a pentagonal geometry.

In another aspect the plurality of individual modules are tapered such that the outer face has a larger cross-section than the inner face. The tapered individual modules are interconnected into a spherical configuration.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

The present disclosure describes a compression chamber 10 that is made of plurality of individual modules joined together to form a chamber with a desired size and shape. This compression chamber can contain a fluid such as for example a liquid metal and be used in a compression system that comprises a plurality of pressure wave generators that generate pressure waves in the fluid inside the compression chamber.

Figure 1:
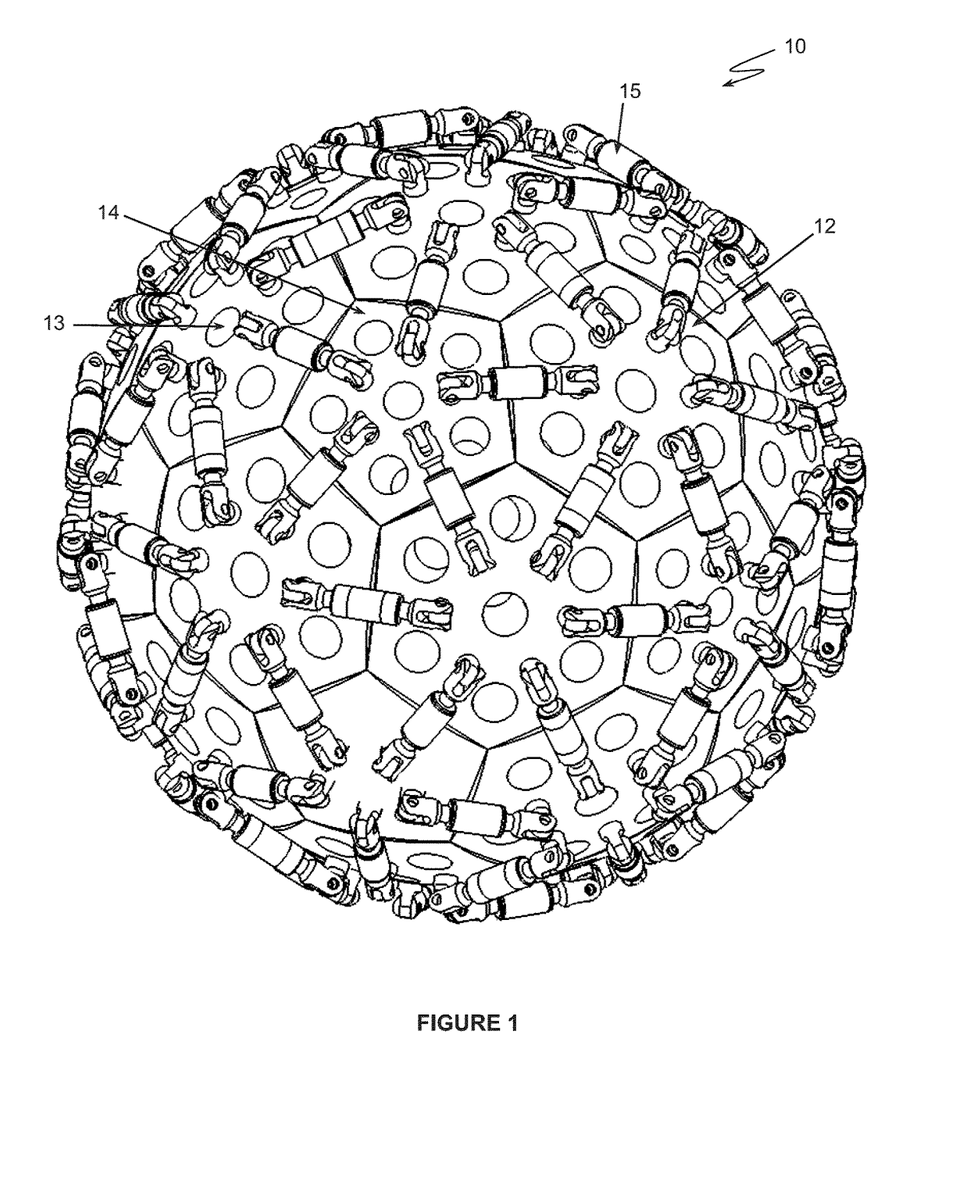
FIG. 1 is a perspective view of a first embodiment of a modular compression chamber having a plurality of modules joined together to form a spherical chamber.

FIG. 1 shows a first embodiment of the compression chamber 10 that comprises a plurality of hexagonal modules 12 and a plurality of pentagonal modules 14 joined together to form a wall 11 (FIG. 2) of the chamber 10. The wall 11 defines an inner cavity of the chamber 10. Each of the modules 12, 14 has an outer face 5, an inner face 7 and a side wall 9 extending between the outer and inner faces 5, 7. The outer faces 5 of the individual modules 12, 14 when interconnected together define the outer surface of the chamber 10 while the inner faces of the modules 12, 14 define the inner surface of the chamber 10, and the side wall 9 of the individual modules 12, 14 forms the wall 11 of the chamber 10. The modules 12 and/or 14 can have any other suitable shape such as triangular, square or any other polygonal or non-polygonal shape or combination thereof depending on a desired shape of the chamber 10. In the illustrated example, the chamber 10 is made of hexagonal and pentagonal modules interconnected into a soccer-ball configuration making a spherically shaped chamber 10; however the chamber 10 can have any other suitable shape such as cylindrical, ellipse, conical, kidney-shape or any other suitable shape or combination thereof without departing from the scope of the invention. At least some of the modules 12 and 14 can comprise a number of openings 13 in which a pressure wave generator 24 (see FIG. 2) is at least partially inserted and secured therein. The opening 13 extends through the side wall 9 from the inner face 7. As can be seen in FIG. 1, the hexagon modules 12 in this embodiment have one central opening and six additional surrounding openings (total of seven openings 13) into which seven pressure wave generators can be at least partially inserted. The pentagonal modules 14 can have six openings 13 (one central and five surrounding openings) for holding six pressure wave generators. The number of openings 13 and thus the number of pressure wave generators in some of the modules 12 and 14 can be more or less than the illustrated numbers. Such openings/generators can be arranged in different configurations without departing from the scope of the invention. In one implementation, the number, size and distribution of the pressure wave generators is such that an energy density within and/or between modules 12, 14 is uniform.

Figure 2:
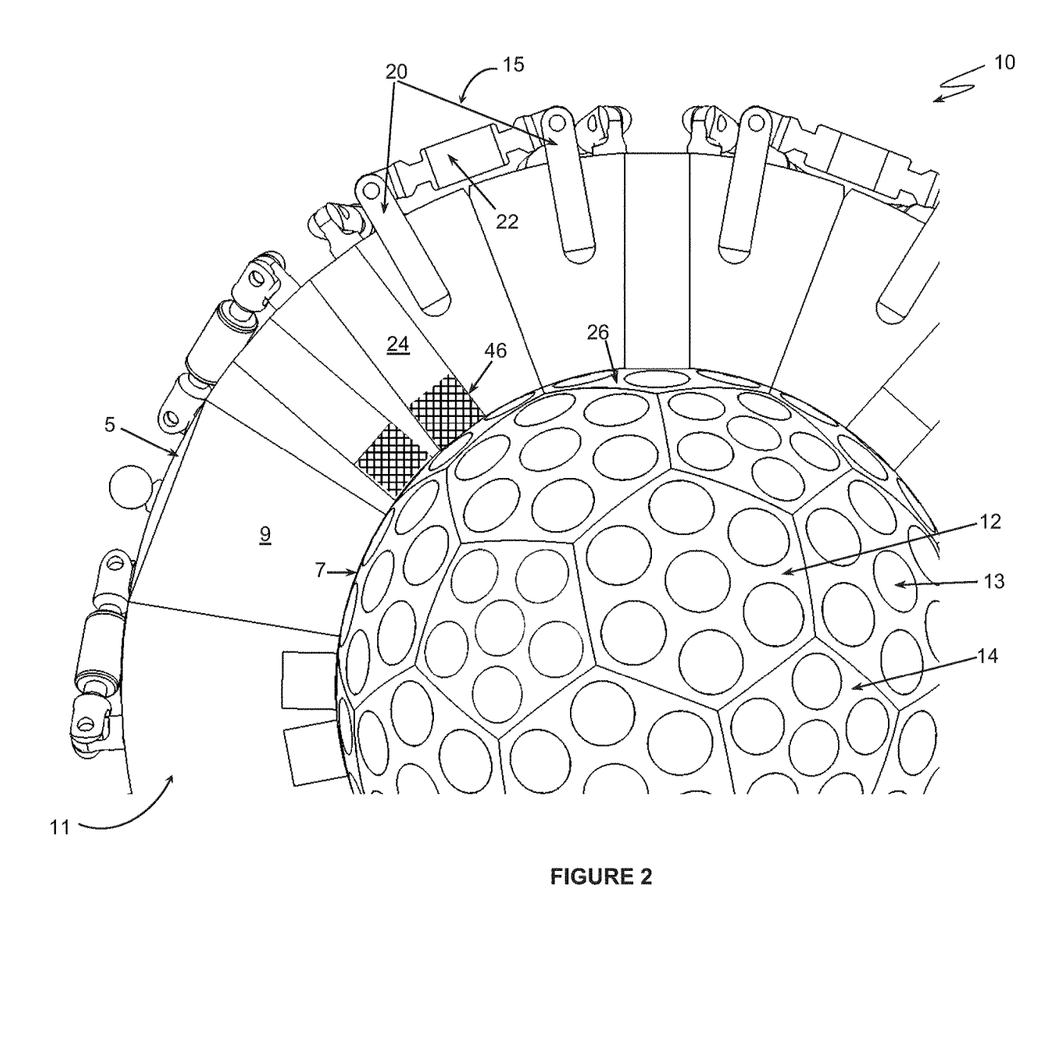
FIG. 2 is a partial cross-sectional view of the modular compression chamber of FIG. 1.

The diameter of each of the openings 13 in the modules 12 and 14 can be the same or alternatively, the diameter of some of the openings 13 can be bigger or smaller than the rest, meaning that the diameter of the corresponding pressure wave generators can be different. The modules 12 and 14 can be made of stainless steel or any other metal alloy or high strength material or combination thereof. In some implementations, the modules 12, 14 can be made of material that has been heat treated or treated using any other known physical or chemical process that can increase the strength and/or durability of such material. The thickness of the side wall 9 of all individual modules 12, 14 (and therefore thickness of the wall 11) can be uniform to create an even and almost smooth inner surface of the wall 11. The thickness of the side wall 9 of each of the modules 12, 14 is chosen so that it can support the respective pressure wave generators and can withstand the internal pressure and/or pressure pulses generated within the chamber 10. For example, the chamber 10 can be shaped as a sphere with an internal radius of about 1.5 m and a wall thickness of about 1.5 m (the thickness of the side wall 9 of each of the modules 12, 14 is about ~1.5 m). This is for illustration purposes only and modules 12, 14 can have thickness bigger or smaller than 1.5 m without departing from the scope of the invention. In case of a spherical chamber 10 each of the modules 12, 14 can have an inwardly tapering configuration along the radius of the chamber (i.e. tapering inwards towards the center of the chamber 10) such that the area of the outer face 5 of the modules 12, 14 is larger than the area of the inner face 7 of the modules 12, 14; however a chamber with other shape (e.g. a rectangular chamber) may require that the modules 12 and 14 have a non-tapered configuration with uniform cross-section along the length.

The inner cavity of the chamber 10 can be partially filled with a fluid, such as, for example a liquid medium. The liquid medium can be a molten metal, such as lead, lithium, sodium, or an alloy, combination, or mixture of such metals.

Each of the modules 12 and 14 is connected to neighboring modules with a connecting means 15 that keeps the adjacent modules 12/14 firmly together in a substantially gapless and fluid tight fashion. FIG. 2 shows a section of the inner cavity of the chamber 10 with a cross-section of the wall 11 of the chamber 10. As can be noticed the wall 11 is formed from a number of individual modules 12, 14 with the outer face 5, inner face 7 and the side wall 9. The individual modules 12, 14 are firmly joined together with tensioned connecting means (i.e. a fastener) 15. The number of fasteners 15 depends on the number of adjacent/neighboring modules. For example, each of the hexagonal modules 12 can comprise six fasteners 15 to connect with the six neighboring modules while each of the pentagonal modules 14 can comprise five fasteners 15 to connect to the five modules adjacent to each of its sides. The connecting means 15 have a robust and strong structure configured to keep the connected modules 12, 14 closely together in compression. In the illustrated example, the connecting means 15 can comprise a pair of elongated rods (studs) 20 connected together via an arm 22. The studs 20 can be made of solid stainless steel or any other suitable material. Each of the studs 20 is sufficiently long so that it can be embedded deeply into the wall of the modules 12, 14. One stud 20 is embedded in one module while the other stud is embedded into the adjacent module. The arm 22 can be configured to keep the two studs tensioned. For example, the arm 22 can comprise a spring that can pull the studs 20 toward each other. Thus, by connecting the neighboring modules 12, 14 using the tensioned connecting means 15, the modules are joined closely together keeping the integrity of the formed chamber 10. The illustrated configuration of the connecting means 15 can also compensate for any slight movement of the modules 12, 14 due to any pressure pulse generated within the chamber 10 and/or the pressure wave generators 24.

In one implementation, the connecting means 15 can be continuous cables (not shown) in tension that can extend around a full circumference of the chamber 10 making a loop and attaching to themselves. The looping cables would mostly apply a normal (inward radial) force to the surface of the chamber 10. The cables can be arranged so that they avoid the pressures wave generators 24, i.e. so that the cables do not come in touch with the pressure wave generators 24, to prevent applying a tangential force therein causing shear to the generators 24 and/or the chamber 10. In other words, the cables each extend around one circumference of the chamber and form a continuous loop in tension, such that a radial force is applied to the wall of the chamber. A person skilled in the art would understand that other suitable connecting means can be used to keep the modules 12, 14 firmly together to form the chamber 10 with a desired shape and size.

Some of the modules 12, 14 can comprise a plurality of openings 13 and a corresponding pressure wave generator 24 can be inserted into each of the openings 13. Each of the pressure wave generators comprises an anvil 46 positioned at the end of a cylindrical bore and a hammer piston slideably inserted into the bore. The anvil 46 has a first end (impact side) facing the hammer piston and a second end with a face in direct communication with the medium contained in the chamber 10. Closely spaced openings 13 may introduce weak points requiring local reinforcement to keep the integrity of the compression chamber 10. In addition, inert areas 26 can be formed between the openings 13, the size of the inert areas 26 can depend on the number, size, shape and distribution of the pressure wave generators 24 and the size and the shape of the compression chamber 10. When the hammer piston of the pressure wave generator 24 hits the corresponding anvil 46 to generate a pressure wave in the chamber 10, these inert areas 26 may produce an uneven internal collective pressure wave with gaps between individual waves. In one implementation, the first end of the anvil 46 can be fitted into the bore while the second end can protrude out of the bore and can have a hexagonal and/or pentagonal cross-section (or any other suitable geometry) so that the inner surface of the chamber 10 would be defined entirely by anvils 46 thus avoiding inert areas 26. Each of the modules 12 and 14 is connected to the neighboring modules with the connecting means 15.

Figure 3:
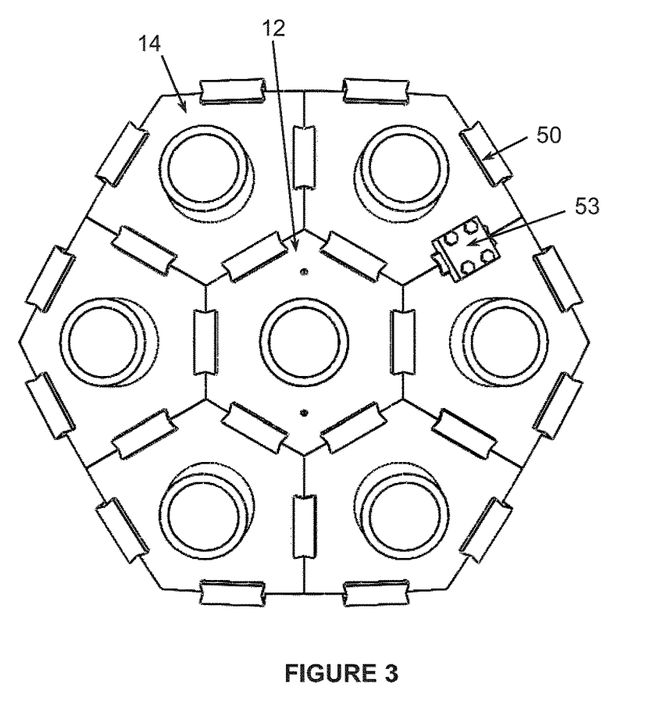
FIG. 3 is a top view of a portion of a second embodiment of a modular compression chamber wherein a central module with a hexagonal geometry is shown surrounded by modules with pentagonal geometries locked together by a plurality of double dovetail wedges.

In one implementation, as illustrated in FIG. 3, the connecting means 15 include a double dovetail wedge 50. Each of the individual modules 12, 14 has at least one dovetail slot (similar to a slot 39 of FIGS. 5-6) that extends from the outer face 5 of the module toward its inner face 7. Each individual module has plurality of such slots. For example, the hexagonal modules 12 have at least six such slots, one on each of its sides, while pentagonal modules 14 have at least five of these slots. When the individual modules 12, 14 are adjacent to each other, the dovetail slot of one module is aligned and faces the dovetail slot of an adjacent module thereby forming a double dovetail passage into which the wedge 50 is inserted. The double dovetail wedge 50 is inserted in the passage formed by the two dovetail slots of the two facing modules 12, 14, so that it pulls the two sides of the two neighboring modules closely together.

Figure 4:
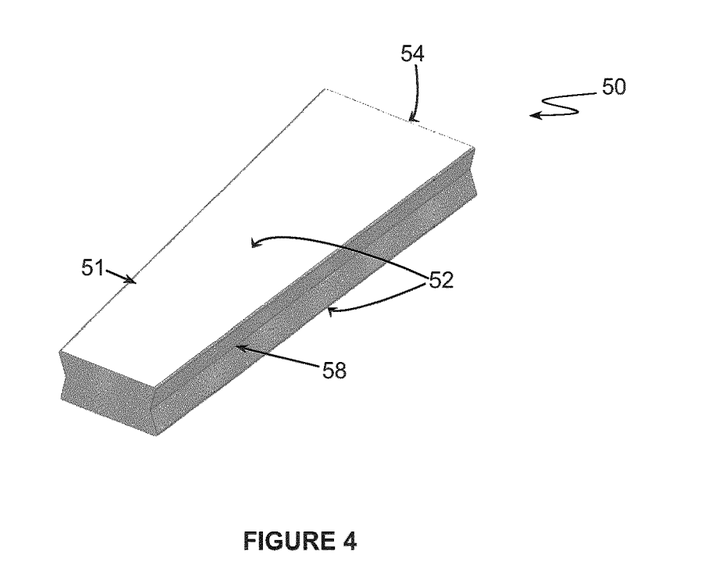
FIG. 4 is a perspective view of the double dovetail wedge of FIG. 3.
Figure 6:
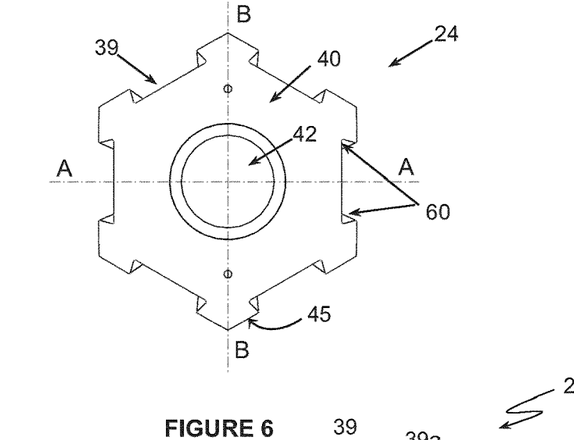
FIG. 6 is an end view of a pressure wave generator in the module of FIG. 5, wherein the pressure wave generator has a housing with a hexagonal cross-section and comprising a slot formed in each of its sidewalls for receiving a respective connecting means for interlocking the pressure wave generator to adjacent pressure wave generators.

FIG. 4 illustrates one example of the dovetail wedge 50 that is configured to be installed within the slot formed in the sidewall of the modules 12, 14. The wedge 50 comprises a tapered solid body 51 with a double dovetail geometry, a dovetail-shaped face 58 and two flat faces 52. The body 51 is shaped and sized to conform to the size/shape of the slot. The double dovetail wedge 50 can be inserted within the passage formed by the adjacent dovetail slots until the dovetail faces 58 engage the sidewall of the two adjacent slots such that the wedge 50 pulls the neighboring modules together into a gapless fashion. As can be seen in FIG. 6, the slot 39 can have a dovetail cross-section with angled sidewalls 60 to conform to the dovetail faces 58 of the wedge 50. The dovetail slot is tapered to conform to the tapering of the wedge 50. In addition, a locker 53 can be provided to lock the wedge 50 into the slot and prevent dislodging of the wedge 50 out of the slot due to pressure pulses. For example, the locker 53 can be a spring or bolt pushing on a back side 54 of the wedge 50.

Figure 5:
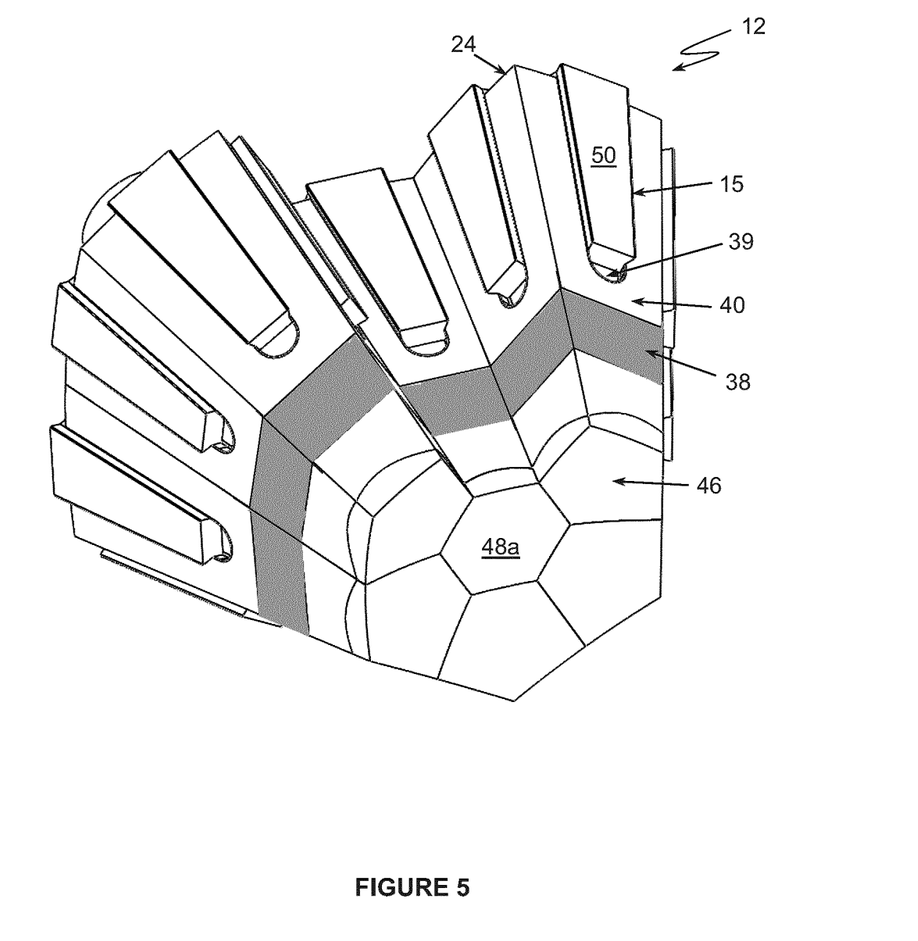
FIG. 5 is a perspective view of a portion of a third embodiment of a modular compression chamber, wherein a single module is shown comprising a plurality of pressure wave generators in adjacent contact and joined together.

According to another embodiment a module of the compression chamber is composed entirely of pressure wave generators in adjacent interlocking contact. In one example as shown in FIG. 5, a hexagonal module 12 is formed of seven pressure wave generators 24 interlocked together. This is for illustration purposes only and the pressure wave generators 24 can be shaped and interlocked so that they can form a module with any other shape without departing from the scope of the invention. In FIG. 5, one generator is omitted to more clearly show the connecting means 15 for attaching the adjacent generators. The pressure wave generators 24 themselves are shaped and assembled together in a completely interlocking fashion such that a chamber with a desired geometry and size can be created. The interlocking nature of the generators 24 create an almost continuous inner surface of the chamber 10 (no or minimal number of inert areas 26) from which the pressure waves emanate from, thus providing a smooth internal collective pressure wave. So, the compression chamber formed of modules as the one illustrated in FIG. 5 would be composed only of pressure wave generators 24 (that can be considered on their own as individual, separate modules).

Figure 6A:
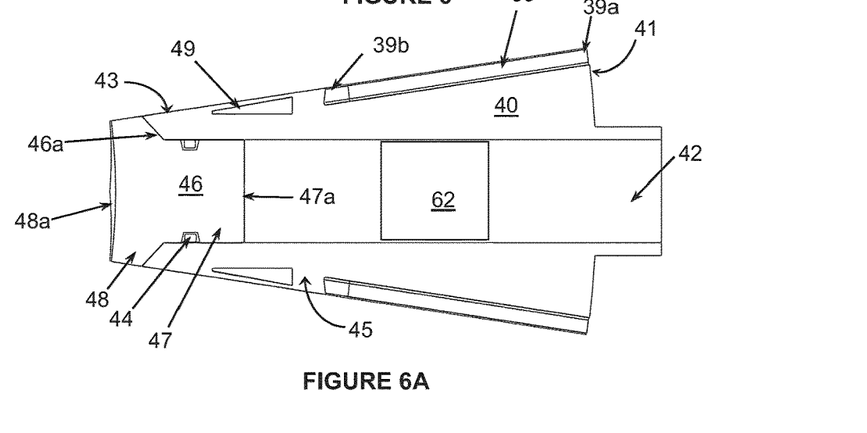
FIG. 6A is a cross-sectional side view of the pressure wave generator of FIG. 6 taken along section line A-A.

The pressure wave generator 24 comprises an elongated housing 40 with a first end 41, second end 43 and a side wall 45 extending between the first and second ends 41, 43 (FIG. 6A). The anvil 46 is inserted at the second end 43 of the housing 40. The anvil 46 is secured to the housing 40, using a retainer 44, so that it cannot be dislodged out of the housing 40 upon the impact with a hammer piston 62. The housing 40 can have different cross-sections depending on the desired shape of the chamber 10. For example, in the embodiment as illustrated in FIG. 5, the housing 40 has either a hexagonal or a pentagonal geometry. In case of a spherically shaped chamber 10, the housing 40 can have a radially tapering configuration, i.e. tapering inwardly from its outer side (the first end 41) toward its inner side (the second end 43). Persons skilled in the art would understand that depending on the desired shape of the chamber 10 the housing 40 can have a uniform diameter along its length without departing from the scope of the invention. In the illustrated example of the module 12 the cross-section/geometry of the housing 40 can be pentagonal or hexagonal; however the housing 40 can have another shape/cross-section without departing from the scope of the invention as long as such pressure wave generators can join together into an interlocking fashion forming one uniform chamber 10 with the desired geometry/shape and size. For example, the desired shape of the chamber 10 can be a sphere with about 1.5 m radius of the inner cavity and a wall thickness of about 1.5 m, thus the length of the housing 40 of each of the generators 24 can be around 1.5 m. Such a chamber 10 can be formed by combination of a number of hexagonal modules 12 and a number of pentagonal modules (see FIG. 1). Some of the hexagonal modules 12 can be created from, for example, seven individual pressure wave generators 24 (one central and six surrounding outer pressure wave generators) where the central generator can have a hexagonal cross-section while the six surrounding outer generators can have pentagonal cross-sections, while some of the pentagonal modules can comprise one central generator with pentagonal geometry and five surrounding outer generators with pentagonal geometry as well. This is for illustration purposes only and person skilled in the art would understand that the pressure wave generators 24 forming the modules and the chamber 10 can have different diameters and geometries without departing from the scope of invention. Details of the pressure wave generators 24 shown in FIG. 5 are illustrated with reference to FIGS. 6, 6A and 6B.

The connecting means 15 are used to maintain intimate contact between the side walls of the adjacent pressure wave generators 24, and maintain such contact against forces and reactions inherent to the pressure wave processes occurring within the chamber 10. The connecting means 15 can comprise the double dovetail wedge 50 that can be installed into the passage formed by two facing dovetail slots 39. The dovetail slot 39 is formed at a sidewall of the pressure wave generators 24. The wedge 50 locks each side of the generator 24 to the facing side of the neighboring generator 24. For example, the central generator 24 can have six dovetail slots (one on each sidewall) and six double dovetail wedges 50 are used to lock such central generator to the six neighboring generators. Likewise, the generators with pentagonal geometry use five wedges 50 to connect to the five neighboring generators.

FIG. 6 shows the slot 39 with angled sidewalls 60 to conform to the dovetail faces 58 of the wedge 50.

FIG. 6A is a cross-section of the generator 24 taken along the section line A-A. The housing 40 has the first end 41 (at the outer side of the pressure wave generator), the second end 43 and a bore 42 formed within the housing 40 that extends between the first end 41 and the second end 43. The hammer piston 62 can be inserted into the bore 42. The hammer piston 62 is sized and shaped so that it can slide within the bore 42. The anvil 46 can be inserted at the second end 43 of the housing 40 and is secured therein by a suitable retaining means 44 so that it cannot be dislodged out of the housing upon the impact with the hammer piston. Each sidewall 45 of the housing 40 can comprise a slot 39 that extends from the first end 41 toward its second end 43. The slot 39 has a first (open) end 39a formed at the first end 41 of the housing 40 and a second (closed) end 39b that is at some distance from the second end 43 of the housing 40. The wedge 50 can be inserted into the slot from its open end 39a. The slot 39 can have a tapering configuration gradually narrowing from the first end 39a toward the second end 39b, so that when the tapered wedge 50 is inserted within the passage formed by the adjacent slots 39 the faces 58 of the wedge 50 engage the respective slots 39 and self-lock therein. The locker 53 (see FIG. 3) can be used to prevent the wedge 50 to come out from the slot 39. For example, the locker 53 can be a spring or bolt pushing on the back 54 of the wedge 50. Persons skilled in the art would understand that any other suitable connecting means can be used to interlock the adjacent pressure wave generators 24 without departing from the scope of the invention.

Figure 6B:
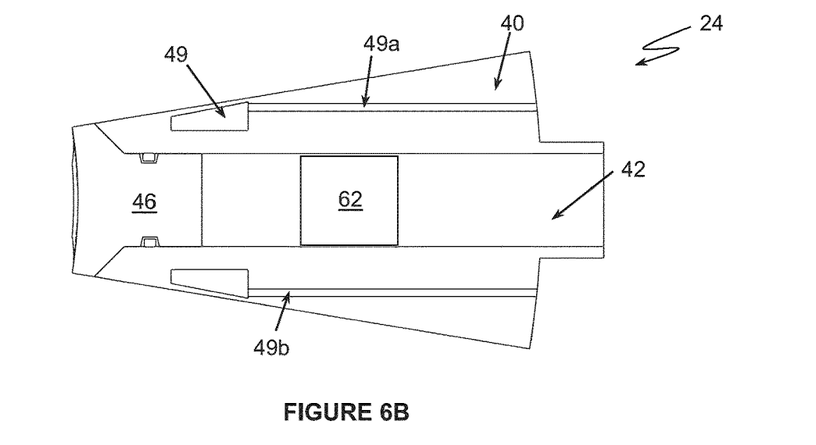
FIG. 6B is a cross-sectional side view of the pressure wave generator of FIG. 6 taken along section line B-B.

As illustrated in FIGS. 6A and 6B, the anvil 46 comprises a first end 47 with an impact surface (wall) 47a facing the bore 42 and the hammer piston 62 and a second end 48 with an outer surface 48a facing the inner cavity of the chamber 10 and in direct contact with the medium contained therein. The hammer piston 62 can be accelerated toward the anvil 46 so that when it impacts the anvil 46 a pressure wave travels through the anvil 46, from the impact surface 47a to the outer surface 48a, and into the fluid medium. The first end 47 of the anvil 46 can be shaped and sized to fit within the bore 42 (conforming with the size and shape of the bore 42 and the hammer piston 62) while its second end 48 can protrude out of the second end 43 of the housing 40 and can have the same cross-section as the housing 40 (at its second end 43). So, the geometry of the housing 40 can define the geometry of the second end 48 of the anvil 46. For example, an anvil inserted into a housing 40 with a hexagonal geometry can have a second end 48 with a hexagonal cross-section while an anvil inserted into a housing 40 with a pentagonal geometry can have a second end 48 with a pentagonal cross-section. The second end 48 of the anvil 46 has a larger cross-section than the first end 47 forming a shoulder 46a. The shoulder 46a is sized and configured to conform to the second end 43 of the housing 40. So, when the anvil 46 is mounted to the housing 40, the first end 47 is fitted within the bore 42 while the shoulder 46a and the second end 48 protrude out of the housing 40 of the pressure wave generators 24. The inner surface of the chamber 10 would be defined entirely by the anvils 46 of the respective pressure wave generators 24. The anvils 46 can be arrange such that only small gaps can exist between adjacent anvils. Such small gaps can accommodate for any slight movement of the anvils 46 that can happen upon the impact of the anvils 46 with the respective hammers.

Alternatively, the housing 40 can be extended so that its second end 43 and the second end 48 of the anvil 46 are aligned. In such case the anvil 46 can be sized to completely fit within the inner bore 42. In one implementation, the outer surface 48a of the anvils 46 can have a concave shape so that a common focus of all radial edges of such anvils can be the center of the spherical chamber thus forming an even and smooth inner surface of such chamber.

In addition, the chamber 10 can comprise a number of fluid tight seals to prevent any significant fluid leakage. Such seals can be selected from any or all of the known dynamic or static seals or any other suitable seal or sealing method or combination thereof that are designed to retain fluids under high pressure. FIG. 6B shows an annular cooling channel or channels 49 formed in the housing 40 around the inner bore so that a cooling zone 38 (see FIG. 5) can be created at a periphery of each of the pressure wave generators 24. Such cooling zone 38 can be used to form a sealing between individual pressure wave generators 24. The cooling channel 49 is formed in the housing in proximity to the second end 43, so that any liquid metal that leaks from the inner cavity of the chamber 10 into any small gaps formed between the adjacent anvils 46 and/or the housings 40 of pressure wave generators 24 can be cooled in situ through heat conduction from a cooling fluid that circulates through the cooling channel 49, and such solidified liquid metal forms a seal/plug retaining the liquid metal contained within the chamber 10, and preventing it continuing past such plug. The cooling fluid is injected into the annular channel 49 through one or more inlet passages 49a and is removed out through one or more outlet passages 49b. The temperature of the cooling fluid should be well below a solidification point of the liquid medium in the compression chamber 10. Various fluids can be used as cooling fluid, e.g. water or air that is at temperature well below the solidification point of the liquid medium. Additionally and alternatively, a number of different seals can be arranged in recesses or grooves around the periphery of each pressure wave generator 24 or between the anvil 46 and an inner surface of the housing 40. For example such seals can include gaskets, rings, or any other suitable sealing structure or combination thereof that can be inserted and compressed during the assembly of the pressure wave generators 24 and/or the compression chamber 10. In addition, a plurality of mechanical attachments can be provided between each pressure wave generators 24 and all of the neighboring generators 24 to hold securely such generators in the desired position and keep such generator in such position against all forces that may be applied to the generators during operation of the compression system. Such attachments could be any or all of for example bolted fish-plates, dovetail keys or wedges, etc. Such attachments would be detachable to allow for removal and re-installation of any individual pressure wave generator 24 without disturbing adjacent generators. Additionally and alternatively, a robust external support device can be provided to support the chamber 10 and each pressure wave generator 24 in its correct position and can provide a holding force along the central axis of each generator 24 towards the center of the chamber 10.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein. Indeed, the novel methods and apparatus described herein may be embodied in a variety of other forms; furthermore, various omissions, substitutions and changes in the form of the methods and systems described herein may be made without departing from the spirit of the inventions disclosed herein.

What is claimed is:

1. A modular compression chamber for use in a compression system for generating pressure waves in a fluid in the compression chamber, the compression chamber comprising:

a plurality of individual modules, each having an outer face, an inner face, and a side wall between the inner and outer faces, at least one individual module being surrounded with two or more neighboring modules in adjacent interlocking contact, wherein the plurality of individual modules are tapered such that an area of the outer face of each individual module is larger than an area of the inner face of each individual module; and a plurality of connecting means interlocking the individual modules together to form a wall of the chamber, wherein the inner face of the individual modules collectively form an inner surface of the wall of the chamber, wherein at least one of the individual modules comprises at least one pressure wave generator configured to generate the pressure wave in the fluid.

2. The modular compression chamber of claim 1, wherein the at least one of the individual modules comprising at least one pressure wave generation has a body with an opening extending through the side wall from the inner face, and the at least one pressure wave generator is inserted into the opening.

3. The modular compression chamber of claim 2, wherein the plurality of individual modules each have a geometry selected from a group consisting of a hexagonal geometry and a pentagonal geometry.

4. The modular compression chamber of claim 1, wherein a shape of the compression chamber is spherical, and the tapered plurality of individual modules are interconnected to form the spherically shaped chamber.

5. The modular compression chamber of claim 1, wherein the pressure wave generator comprises a body with a housing having a first end, a second end, an elongated bore extending from the second end into the body, an anvil mounted at the second end of the body such that a second end of the anvil forms at least a part of the inner face of one of the individual modules and a piston inserted into the bore and being able to slide between the first and the second end of the housing, a cross-section at a first end of the anvil is smaller than a cross-section at the second end of the anvil, wherein the anvil comprises a shoulder between the first end and the second end, and wherein the shoulder and the second end protrude out of the bore when the anvil is mounted at the second end of the body.

6. The modular compression chamber of claim 5, wherein the second end of the anvil has a face with a geometry selected from a group consisting of a hexagonal geometry and a pentagonal geometry.

7. The modular compression chamber of claim 1, wherein the at least one of the individual modules is composed entirely of pressure wave generators in adjacent contact and interlocked together such that the bodies of the pressure wave generators define the side wall of the at least one of the individual modules.

8. The modular compression chamber of claim 7, wherein the plurality of connecting means comprise a dovetail shaped slot formed in a side wall of a housing of each of the plurality of pressure wave generators, the slot extending from a first end toward a second end of the housing of each pressure wave generator, the slot of one of the plurality of pressure wave generators facing the slot of an adjacent one of the plurality of pressure wave generators thereby forming a double dovetail shaped passage, the plurality of connecting means further comprising a double dovetail wedge mating with the double dovetail passage such that when inserted into the double dovetail passage the adjacent pressure wave generators are interlocked.

9. The modular compression chamber of claim 8, wherein the plurality of connecting means further comprise a locker contacting the double dovetail wedge such that a continuous pushing force is applied to a back side of the double dovetail wedge thereby keeping the wedge within the passage.

10. The modular compression chamber of claim 7, wherein the at least one of the individual modules comprising a plurality of pressure wave generators in adjacent interlocked contact have a hexagonal geometry, each such individual module comprises a central pressure wave generator and six outer pressure wave generators surrounding the central pressure wave generator, the central pressure wave generator having an anvil with a second end having a hexagonal face, and the six outer pressure wave generators each having an anvil with a second end having a pentagonal face.

11. The modular compression chamber of claim 7, wherein the at least one of the individual modules comprising a plurality of pressure wave generators in adjacent interlocked contact have a pentagonal cross-section geometry, each such individual module comprises a central pressure wave generator and five outer pressure wave generators surrounding the central pressure wave generator, the central and outer pressure wave generators each having an anvil with a second end having a pentagonal face.

12. The modular compression chamber of claim 7, wherein the plurality of pressure wave generators each have a housing with a first end and a second end, the housing having a tapered configuration narrowing from its first end toward its second end, such that an area of the outer face of the individual module is larger area than an area of the inner face of the individual module.

13. The modular compression chamber of claim 1, wherein the plurality of connecting means comprise at least two elongated studs connected together via a pre-stressed spring to keep the studs tensioned, wherein one stud is inserted into the outside wall of one of the individual modules and another stud is inserted into a neighboring one of the modules.

14. The modular compression chamber of claim 1, wherein the plurality of connecting means comprise cables each extending around one circumference of the chamber and forming a continuous loop in tension, such that a radial force is applied to the wall of the chamber.

15. The modular compression chamber of claim 1, wherein the plurality of connecting means comprise at least one dovetail-shaped slot formed in the side wall of each individual module, the slot extending from the outer face toward the inner face of the module, the at least one dovetail shaped slot of one of the individual modules facing the at least one dovetail shaped slot of an adjacent one of the individual modules and forming a double dovetail shaped passage, the plurality of connecting means further comprising a double dovetail wedge mating with the double dovetail shaped passage such that when inserted into the double dovetail passage the adjacent pressure wave generators are interlocked.

16. The modular compression chamber of claim 15, wherein the plurality of connecting means further comprise a locker contacting the double dovetail wedge such that a continuous pushing force is applied to a back side of the double dovetail wedge keeping the wedge within the passage.

17. The modular compression chamber of claim 1, further comprising at least one seal positioned between adjacent individual modules.

* * * * *